(12) United States Patent
Atkins et al.

(10) Patent No.: US 9,839,306 B2
(45) Date of Patent: Dec. 12, 2017

(54) FOOD SHIELD DETENT MECHANISM

(71) Applicant: Brass Smith LLC, Denver, CO (US)

(72) Inventors: Scott Atkins, Denver, CO (US);
Andrew Padden, Denver, CO (US);
Shane Korthuis, Denver, CO (US);
Marc Hanchak, Denver, CO (US);
Wayne Sirmons, Denver, CO (US)

(73) Assignee: Brass Smith, LLC, Denver, CO (US)

( * ) Notice: Subject to any disclaimer, the term of this patent is extended or adjusted under 35 U.S.C. 154(b) by 0 days.

(21) Appl. No.: 15/221,281

(22) Filed: Jul. 27, 2016

(65) Prior Publication Data

US 2016/0331155 A1    Nov. 17, 2016

Related U.S. Application Data

(63) Continuation-in-part of application No. 14/621,154, filed on Feb. 12, 2015.

(51) Int. Cl.
*A47F 9/00* (2006.01)
*A47F 10/06* (2006.01)
*F16M 11/10* (2006.01)

(52) U.S. Cl.
CPC .......... *A47F 10/06* (2013.01); *F16M 11/10* (2013.01); *A47F 2010/065* (2013.01); *F16M 2200/024* (2013.01)

(58) Field of Classification Search
CPC ......... A47F 3/12; E05D 11/1078; F16C 11/10
USPC ....... 312/137; 16/329, 275, 303; 403/94, 96; 292/140, 170
See application file for complete search history.

(56) References Cited

U.S. PATENT DOCUMENTS

| | | | | |
|---|---|---|---|---|
| 995,410 A * | 6/1911 | McClure | ............... | A47F 3/007 312/137 |
| 1,115,450 A * | 10/1914 | Parizek | ............... | E05D 11/1078 16/329 |
| 2,488,222 A * | 11/1949 | Morgan | ............... | A47B 39/04 16/363 |
| 2,726,889 A * | 12/1955 | Lawson | ............... | E05C 1/14 292/170 |
| 5,713,633 A * | 2/1998 | Lu | ............... | B60N 2/4844 297/188.04 |
| 7,168,133 B2 * | 1/2007 | Luo | ............... | H04M 1/0216 16/303 |
| 8,109,579 B2 * | 2/2012 | English | ............... | A47B 96/062 211/150 |

* cited by examiner

*Primary Examiner* — Matthew Ing
(74) *Attorney, Agent, or Firm* — Kilpatrick Townsend & Stockton LLP

(57) ABSTRACT

A rotation and detent mechanism includes a body defining a cavity and having a travel limiter with two fixed faces protruding into the cavity. A detent plate nests and rotates within the cavity and has two limiting surfaces between which the travel limiter of the body is disposed. One of the limiting surfaces engages a respective one of the travel limiting faces of the body at each extreme of angular rotation of the detent plate. The detent plate includes recesses for engaging one or more spring loaded ball plungers mounted in the body. Each ball plunger engages a recess in the detent plate at certain angular detent positions of the detent plate within the body. The mechanism further includes an axle on which the detent plate rotates, and a coil spring that engages the detent plate, resisting rotation of the detent plate in one rotational direction.

18 Claims, 17 Drawing Sheets

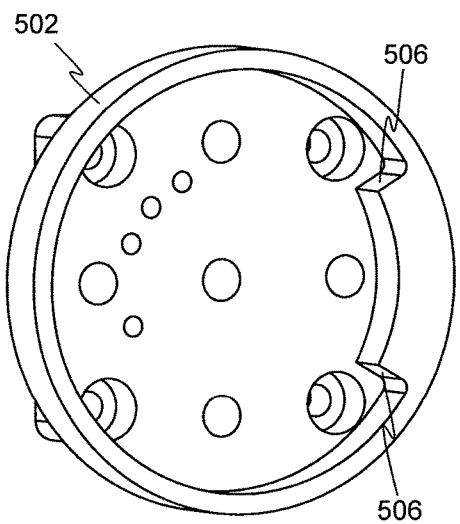 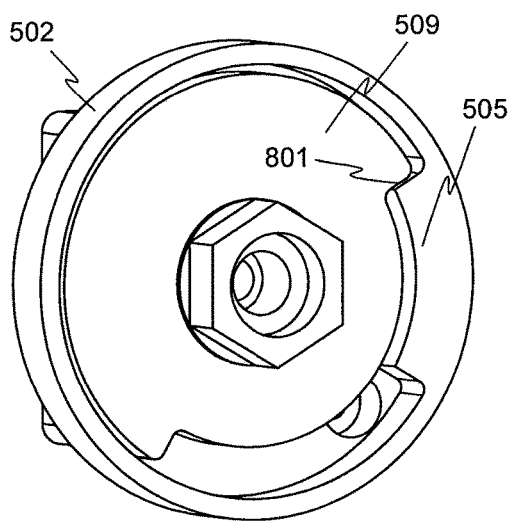
FIG. 6  FIG. 8
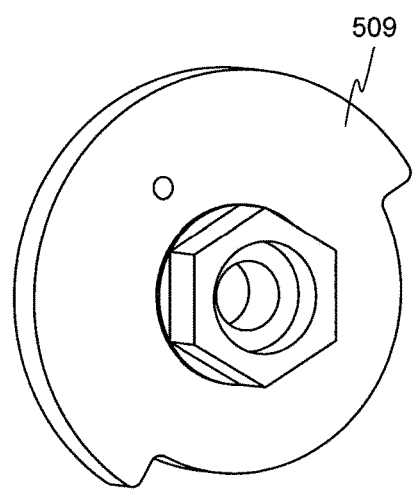 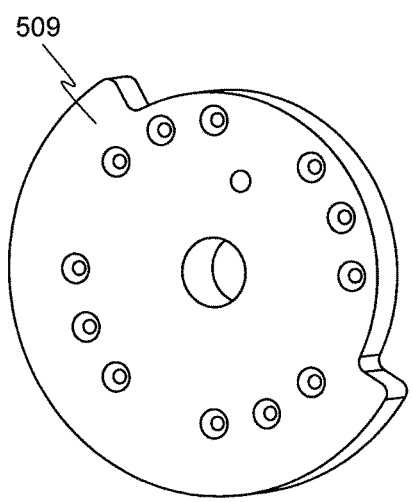
FIG. 7A  FIG. 7B though, 306 B2

FOOD SHIELD DETENT MECHANISM

This application is a continuation-in-part of U.S. patent application Ser. No. 14/621,154 filed Feb. 12, 2015 and titled "Adjustable Food Shield with Detents", the entire disclosure of which is hereby incorporated by reference herein for all purposes.

BACKGROUND OF THE INVENTION

Food shields, also sometimes called sneeze guards, are used in a variety of settings. Typically, a clear panel is suspended over a buffet, smorgasbord, salad bar, retail display, or other kind of food display to protect the food from falling debris or other contamination. One or more panels may also be placed between the displayed food and customers, such that the customers must reach under the food shield to have access to the food, and the opportunities for contamination are limited.

Various health and safety codes and independent design guidelines may specify the required position of the food shield in relation to the food display. Because food shields are used in many different locations, it is desirable that a food shield be easily adjustable, so that it can be adapted to different spaces and uses. Some prior food shields are described in U.S. Pat. No. 6,588,863 to Yatchak et al., issued Jul. 8, 2003 and titled "Sneeze Guards and Methods for Their Construction", the entire disclosure of which is hereby incorporated herein by reference for all purposes. While the sneeze guards described in that patent have proven very useful, even more adjustability and configurability are desirable. Other prior food shields are described in U.S. Patent Application Publication No. 2011/0169384 of Padden et al., filed published Jul. 14, 2011 and titled "Food Shield", and U.S. Pat. No. 8,403,430 to Atkins, issued Mar. 26, 2013 and titled "Adjustable Food Shield", the disclosures of which are hereby incorporated herein by reference for all purposes.

BRIEF SUMMARY OF THE INVENTION

According to one aspect, a rotation and detent mechanism comprises a body defining a cavity and having a travel limiter protruding into the cavity. The travel limiter has two fixed faces. The rotation and detent mechanism further comprises a detent plate of a shape and size to nest and rotate within the cavity of the body. The detent plate has two limiting surfaces between which the travel limiter of the body is disposed, such that one of the two limiting surfaces engages a respective one of the fixed travel limiting faces of the body at each extreme of angular rotation of the detent plate. The detent plate includes a plurality of recesses on a face perpendicular to the axis of the rotation of the detent plate. The rotation and detent mechanism further includes one or more spring loaded ball plungers mounted in the body and aligned with the axis of rotation of the detent plate. Each ball plunger is positioned to engage a recess in the detent plate at each of certain angular positions of the detent plate within the body, such that the certain angular positions are detent positions. The mechanism further includes an axle on which the detent plate rotates, the axle defining an axis of rotation of the detent plate, and a coil spring that engages the detent plate and the body such that the coil spring resists rotation of the detent plate within the body in one rotational direction.

BRIEF DESCRIPTION OF THE DRAWINGS

FIG. 6 illustrates a more detailed view of a detent body, in accordance with embodiments of the invention.

FIGS. 7A and 7B show more detailed views of a detent plate, in accordance with embodiments of the invention.

FIG. 8 illustrates the detent body of FIG. 6 and the detent plate of FIGS. 7A and 7B nested together as when assembled into the food shield of FIG. 1, in accordance with embodiments of the invention.

DETAILED DESCRIPTION OF THE INVENTION

Figure 1:
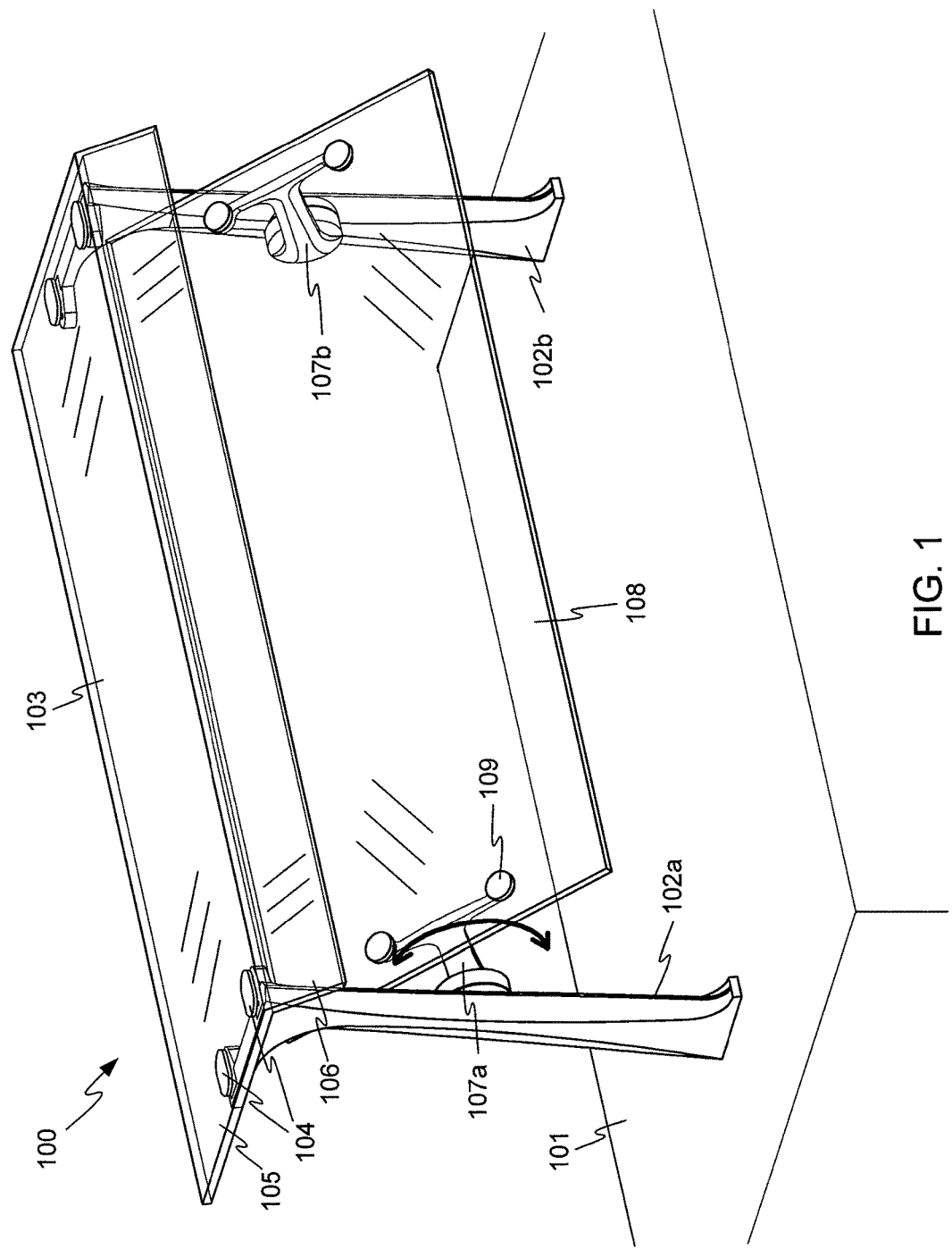
FIG. 1 shows an adjustable food shield in accordance with embodiments of the invention.

FIG. 1 shows an adjustable food shield 100 in accordance with embodiments of the invention. Example food shield 100 is mountable to a surface 101, which may be for example a surface of a buffet table, serving counter, or other installation where protection of items is desired. In the case of a food service installation, it may also be desired that the food items be attractively displayed and be visible, and in the case of a self-service buffet, customer access to the food items is necessary.

Food shield 100 includes two support columns 102a and 102b, one at each end of food shield 100. Preferably, support columns 102a and 102b include features for attaching them securely to surface 100. For example, support columns 102a and 102b may include threaded holes (not visible) in their bottom faces, to receive mounting bolts from below surface 101. Other mounting methods are also possible. Each of support columns 102a and 102b includes a bottom end at surface 101, and a top end opposite the bottom end. Support columns 102a and 102b may be made from any suitable material and formed in any suitable way. For example, support columns 102a and 102b may be made of a metal such as steel, zinc, or aluminum, may be made of a filled or unfilled polymer or polymer blend, may be made of a composite, or may be made of another suitable material, or of a combination of materials. The support columns may be fabricated by die casting, sand casting, machining, sintering, injection molding, or by another suitable technique, or by a combination of fabrication techniques. Conveniently, support columns 102a and 102b but may die cast from zinc or aluminum, with secondary machining for certain details. If desired, support columns 102a and 102b may be plated, painted, or otherwise decoratively finished.

A top shelf 103 rests on and is attached to the top ends of support columns 102a and 102b. Top shelf 103 may (but need not) be made of glass or another transparent material, and may be attached to support columns 102a and 102b by any convenient technique, for example by bolts through holes in top shelf 103 and threaded into support columns 102a and 102b. Such bolts may have decorative heads, or may be covered with decorative caps 104. Other fastening techniques may be used as well.

Top shelf 103 may function as a shelf, for example to display items placed on top of shelf 103, and also functions as a shield to protect the area below top shelf 103 from contamination that my fall from above. In some embodiments, top shelf 103 includes a horizontal main portion 105 and a downwardly-angled lip 106 joined to the front edge of main portion 105 shared with lip 106. The two portions may be made of glass, and may be bonded together, for example using an adhesive cured by ultraviolet light. Lip 106 may provide additional protection of the displayed items, and may assist in meeting food shield design guidelines as is explained in more detail below. Although other dimensions may be used, top shelf 103 may be disposed about 20 to 21 inches above surface 101.

Food shield 100 further includes a pair of rotation arms 107a and 107b, and a shield panel 108 fixed to the rotation arms 107a and 107b. Rotation arms 107a and 107b and shield panel 108 are rotatable as indicated in FIG. 1, about an axis defined by a pair of rotation and detent mechanisms (not visible in FIG. 1 but described in detail below). Rotation arms 107a and 107b may be made of any suitable material and may be made in any suitable way, but may conveniently be made using the same materials and finishes as support columns 102a and 102b. Shield panel 108 may be affixed to rotation arms 107a and 107b by any suitable technique, for example by bolts 109 through holes in shield panel 108 and threaded into rotation arms 107a and 107b. Bolts 109 may have decorative heads or may be covered by decorative caps, if desired.

Figure 2:
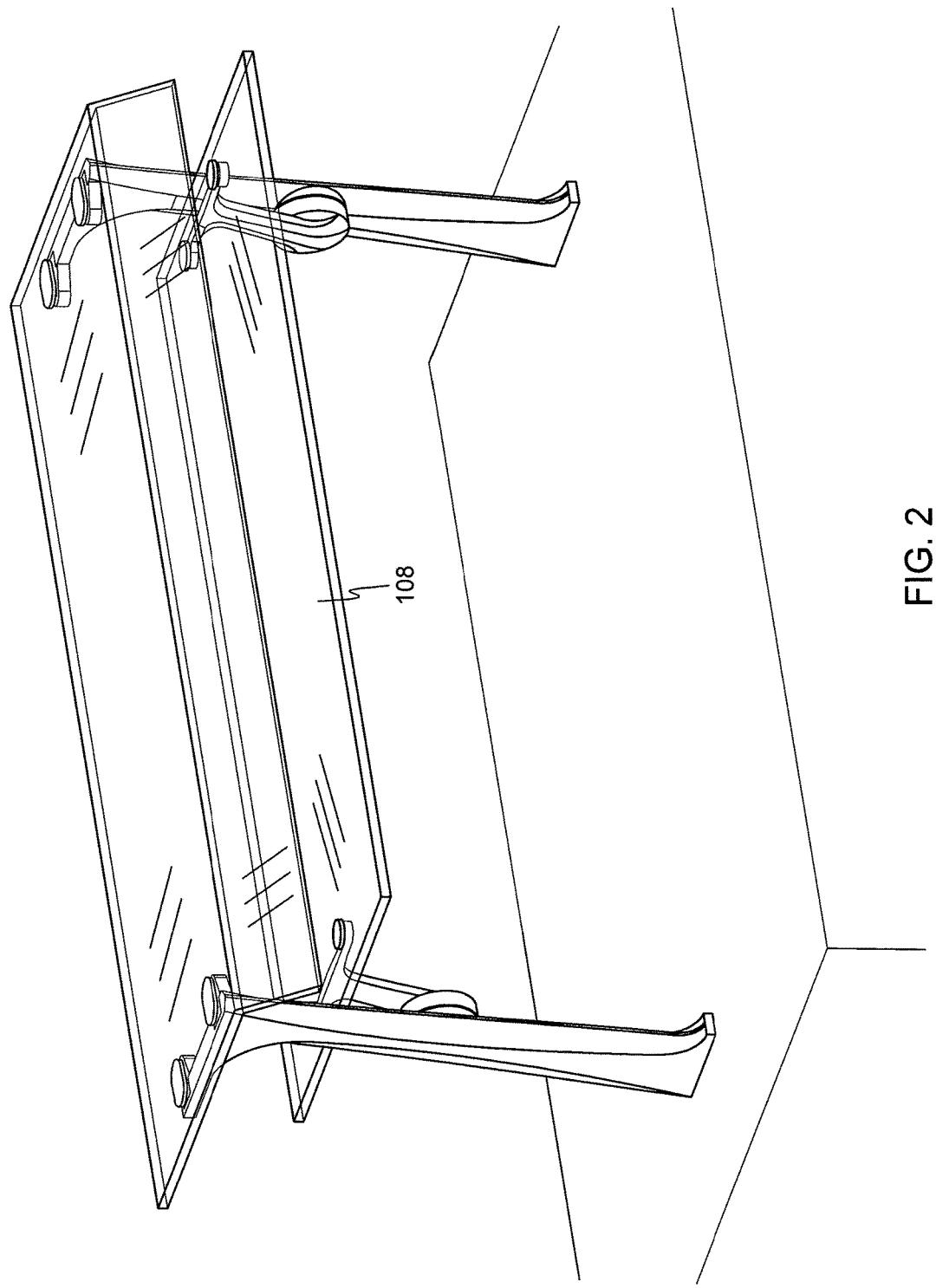
FIG. 2 illustrates the adjustable food shield of FIG. 1 in an alternate configuration.
Figure 3:
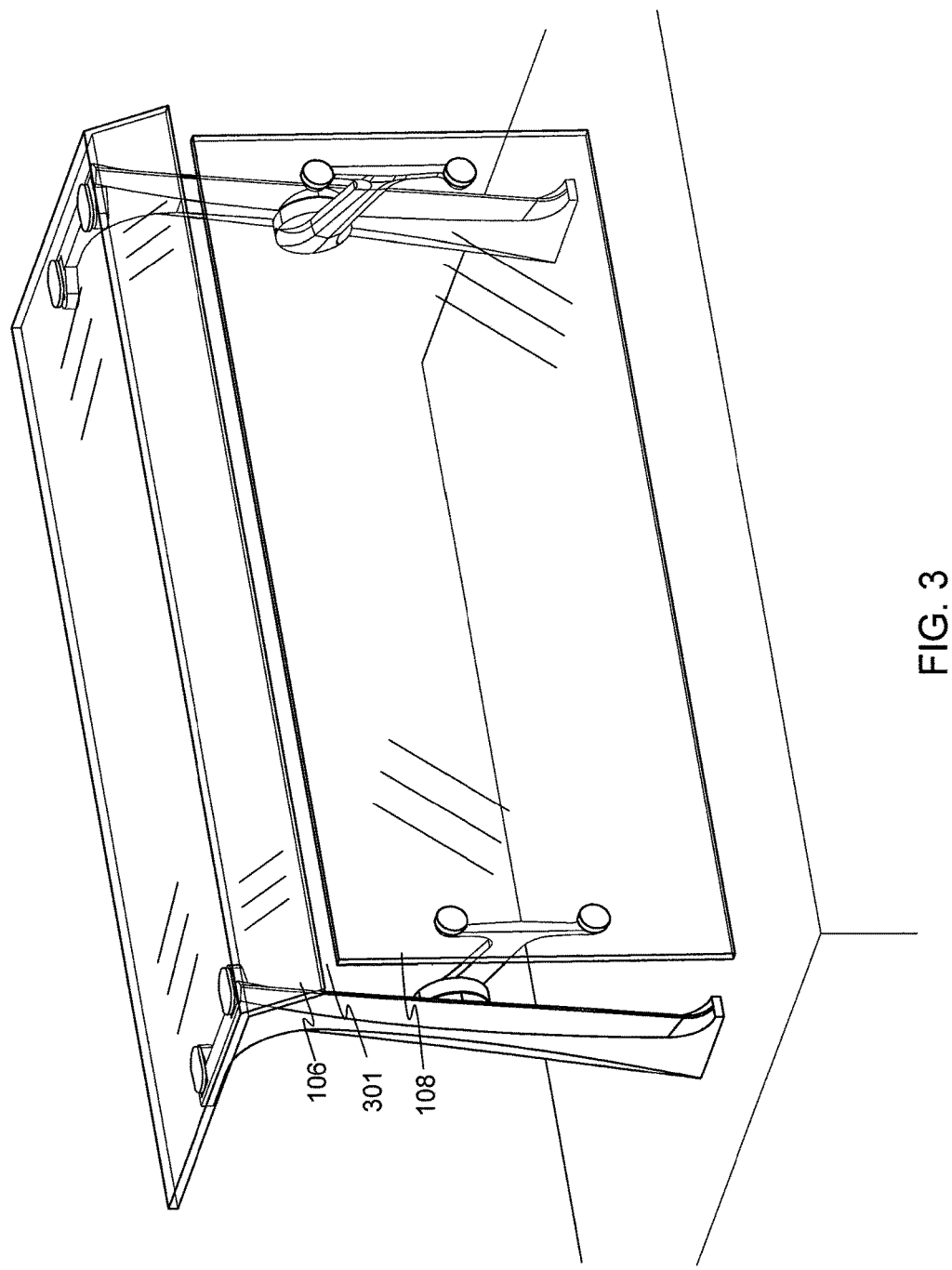
FIG. 3 illustrates the adjustable food shield of FIG. 1 in another alternate configuration.

Shield panel 108 can preferably reach at least a horizontal orientation under top shelf 103, as shown in FIG. 2, and a vertical orientation near and below the bottom edge of lip 106, as shown in FIG. 3. Preferably, the gap 301 remaining between lip 106 and shield panel 108 when shield panel 108 is in the vertical orientation is 0.75 inches or less across, in accordance with certain food shield design guidelines. Shield panel 108 may be made of glass or another transparent material when visibility of protected items is desired.

In addition to the orientation shown in FIG. 1, in which shield panel is at 45 degrees from horizontal or vertical, shield panel 108 can reach other intermediate orientations as well. For example, shield panel 108 may be placed in an intermediate orientation similar to that shown in FIG. 4, to allow customer access to buffet items or the like. In accordance with certain guidelines, the distance 401 from surface 101 to the lower edge of shield panel 108 may be about 13 inches. In the example embodiment of FIG. 4, this corresponds to placing shield panel 108 at about 22.5 degrees from horizontal, but other angles may be used, but the correct spacing to surface 101 may be achieved using different angles in other embodiments.

Figure 5A:
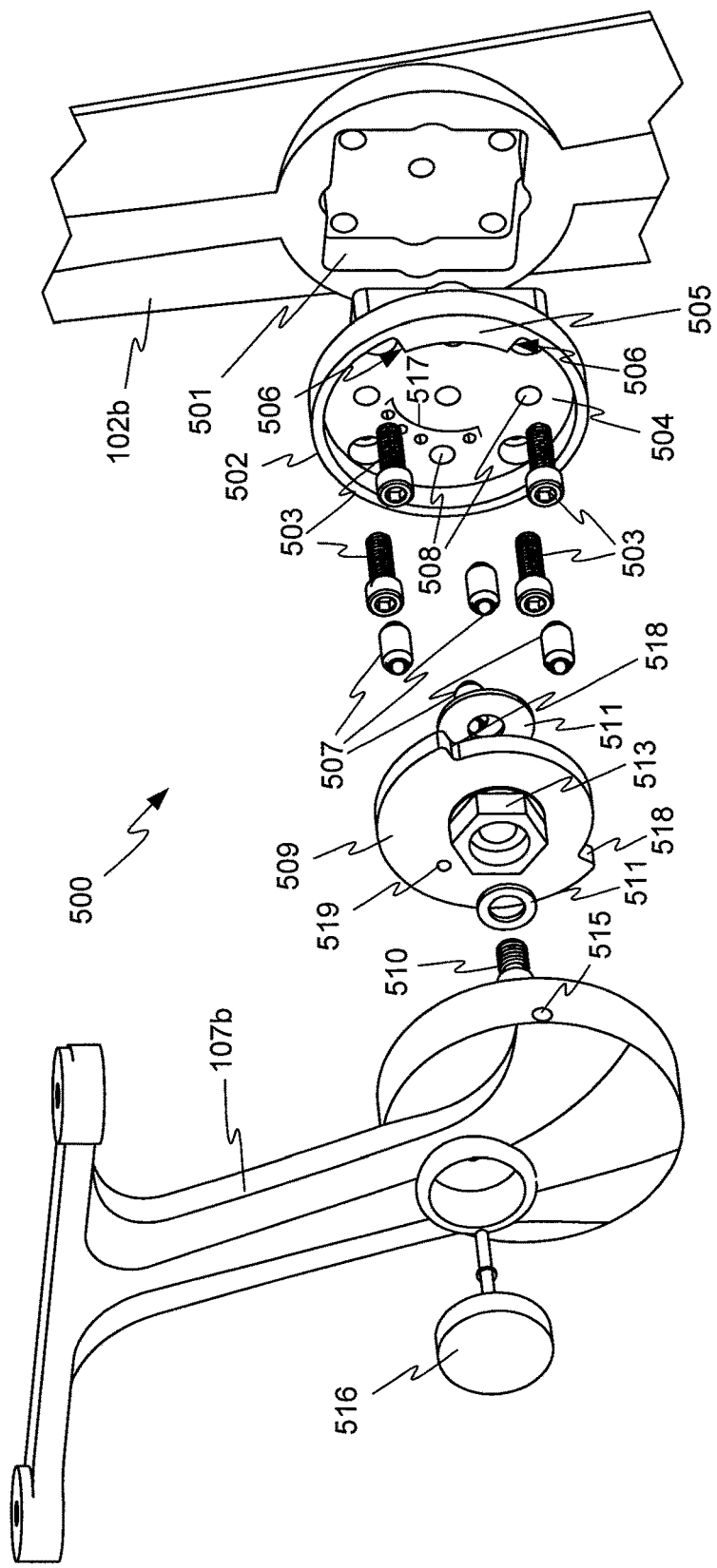
FIGS. 5A and 5B provide exploded perspective views from two different angles of a rotation and detent mechanism, in accordance with embodiments of the invention.
Figure 5B:
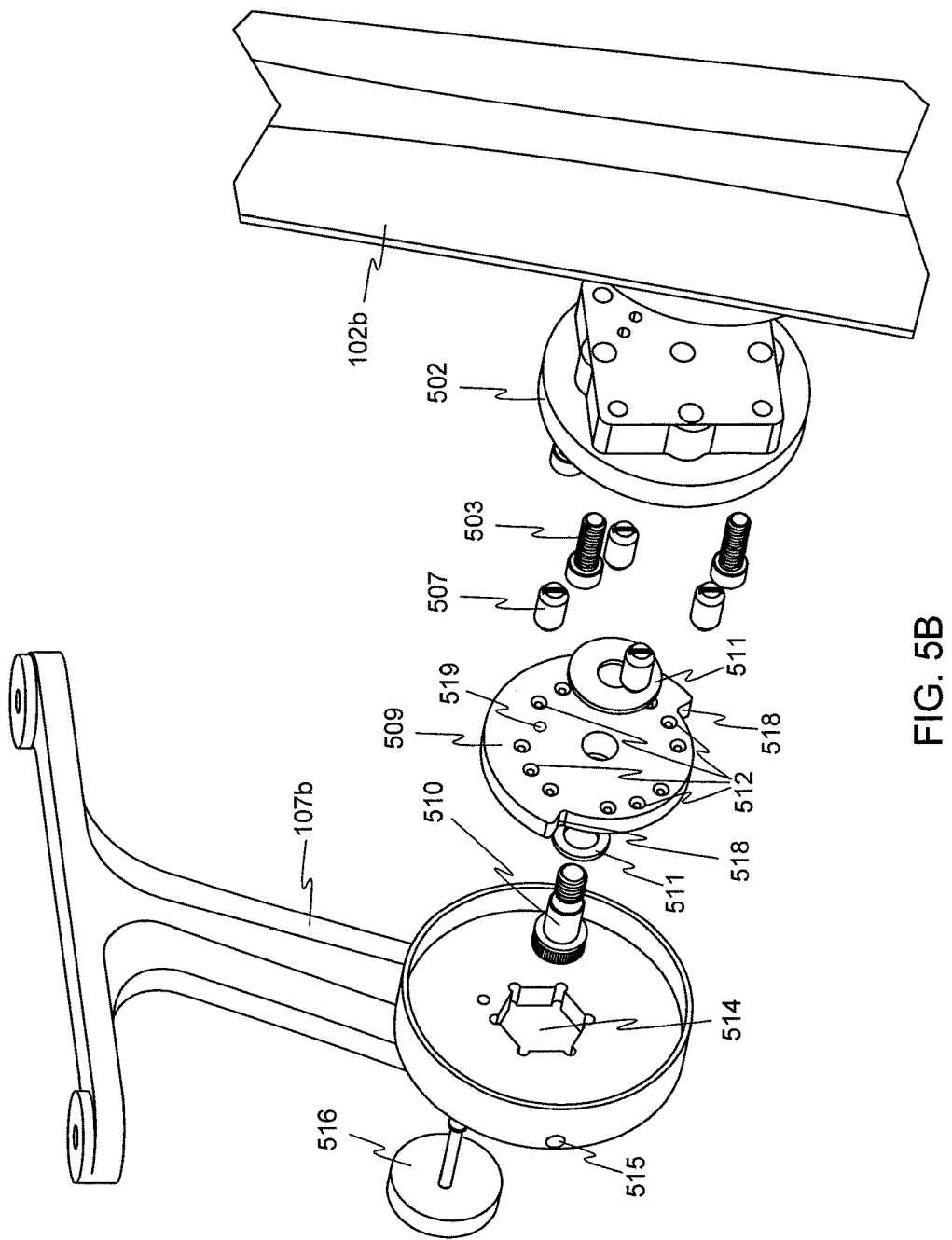

A pair of rotation and detent mechanisms is provided at the connections of rotation arms 107a and 107b to support columns 102a and 102b. FIGS. 5A and 5B provide exploded perspective views from two different angles of a rotation and detent mechanism 500, in accordance with embodiments of the invention.

As shown in FIG. 5A, support column 102b has an integral pocket 501 for coupling to rotation and detent mechanism 500. For example, pocket 501 may be formed during die casting, molding, or machining of support column 102b. A detent body 502 attaches to support column 102b via bolts 503. Detent body 502 defines a cavity 504, which in this example is generally cylindrical, although this is not a requirement. Protruding into cavity 504 is a travel limiter 505, which has two fixed travel limiting faces 506. (Only edges of travel limiting faces 506 are visible in FIG. 5A.) Detent body 502 may be made of any suitable material and by any suitable process, but may conveniently be made using materials and processes similar to those used to make support column 102b.

One or more spring loaded ball plungers 507 are placed in holes 508 in detent body 502. As will be appreciated, detent body 502 remains stationary, attached to support column 102b and holding ball plungers 507.

A detent plate 509 is of a shape and size to rotate within cavity 504, on a shoulder screw 510 (best visible in FIG. 5B) that acts as an axle about which detent plate 509 rotates, and that defines the axis of rotation of detent plate 509. Thrust washers 511 may be used to minimize mechanical play between detent plate 509 and other components. Detent plate 509 includes a number of recesses 512 positioned to align with ball plungers 507 when shield panel 108 is in its respective detent positions. In FIG. 5B, four sets of three recesses 512 are shown, even though example food shield 100 can place shield panel 108 in four different detent positions. Some of recesses 512 can be used by different ball plungers, for example when shield panel 108 is in its vertical and horizontal orientations.

Detent plate 509 may be made of any suitable material and by any suitable process, but may conveniently be machined from steel or stainless steel, and may be hardened if desired.

Detent plate 509 also includes a geometric protrusion 513 (visible in FIG. 5A) of a size to mate with geometric recess 514 (visible in FIG. 5B) in rotation arm 107b. The nesting of geometric protrusion 513 and recess 514 helps prevent relative rotation between rotation arm 107b and detent plate 509. A setscrew (not shown) may also be inserted through hole 515 to bear on a surface of geometric protrusion 513, to hold rotation arm 107b to detent plate 509.

When rotation arm 107b and detent plate 509 reach one of the detent positions, ball plungers 507 fall into recesses 512, to hold rotation arm 107b and detent plate 509 in the detent position. The detent action of the ball plungers can be overcome by moderate force on rotation arms 107a and 107b or shield panel 108. A locking pin 516 may also be used, passing through detent plate 509 via hole 519 and engaging one of locking holes 517 in detent body 502, to lock the system in the detent position.

Detent plate 509 also includes two travel limiting surfaces 518 that respectively engage travel limiting faces 506 of detent body 502 at the extremes of travel of shield plate 108.

FIG. 6 illustrates a more detailed view of example detent body 502. In particular, travel limiting faces 506 are visible in FIG. 6. FIGS. 7A and 7B show more detailed views of example detent plate 509. It will be appreciated that in some embodiments, mirror image left- and right-handed versions of some parts may be provided, possibly including detent plate 509, support columns 102a and 102b, and rotation arms 107a and 107b. In other embodiments, identical versions of some or all of these parts may be usable at both ends of food shield 100.

FIG. 8 illustrates detent body 502 and detent plate nested together as when assembled into food shield 100. In the configuration of FIG. 8, detent plate 509 is at one extreme of its travel, and has contacted travel limiter 505 at interface 801.

Figure 9:
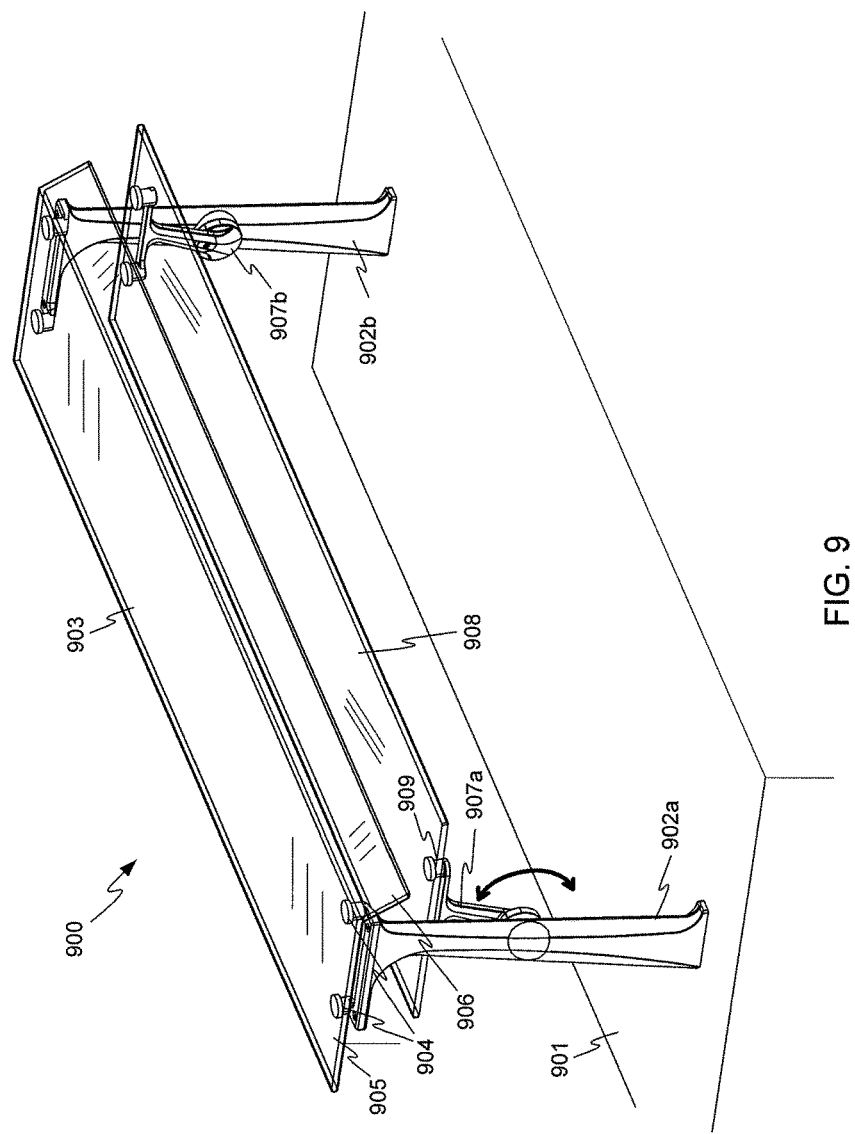
FIG. 9 illustrates an adjustable food shield in accordance with other embodiments.

FIG. 9 illustrates an adjustable food shield 900 in accordance with other embodiments. Like food shield 100 described above, food shield 900 is mountable to a surface 901, for example a surface of a buffet table, serving counter, or other installation where protection of items is desired.

Food shield 900 also includes two support columns 902a and 902b, one at each end of food shield 900, attachable to surface 901. Each of support columns 902a and 902b includes a bottom end at surface 901, and a top end opposite the bottom end. Support columns 902a and 902b may be made from any suitable material and formed in any suitable way. For example, support columns 902a and 902b may be made of a metal such as steel, zinc, or aluminum, may be made of a filled or unfilled polymer or polymer blend, may be made of a composite, or may be made of another suitable material, or of a combination of materials. The support columns may be fabricated by die casting, sand casting, machining, sintering, injection molding, or by another suitable technique, or by a combination of fabrication techniques. Conveniently, support columns 902a and 902b but may die cast from zinc or aluminum, with secondary machining for certain details. If desired, support columns 902a and 902b may be plated, painted, or otherwise decoratively finished.

A top shelf 903 rests on and is attached to the top ends of support columns 902a and 902b. Top shelf 903 may (but need not) be made of glass or another transparent material, and may be attached to support columns 902a and 902b by any convenient technique, for example using screws with decorative heads or caps 904. Additional embodiments of the attachment of top shelf 903 to support columns 902a and 902b are described in more detail below. In some embodiments, top shelf 903 includes a horizontal main portion 905 and a downwardly-angled lip 906 joined to the front edge of main portion 905 shared with lip 906. The two portions may be made of glass, and may be bonded together, for example using an adhesive cured by ultraviolet light.

Top shelf 903 may function as a shelf, for example to display items placed on top of shelf 903, and also functions as a shield to protect the area below top shelf 903 from contamination that my fall from above. Top shelf 903 may be of materials and construction similar to shelf 103 described above, and may be similarly positioned in relation to surface 901.

Food shield 900 further includes a pair of rotation arms 907a and 907b, and a shield panel 908 fixed to the rotation arms 907a and 907b. Rotation arms 907a and 907b and shield panel 908 are rotatable as indicated in FIG. 9, about an axis defined by a pair of rotation and detent mechanisms (not visible in FIG. 9 but described in detail below). Rotation arms 907a and 907b may be made of any suitable material and may be made in any suitable way. Shield panel 908 may be affixed to rotation arms 107a and 107b by bolts 909 through holes in shield panel 908 and threaded into rotation arms 907a and 907b, or by another suitable method. Bolts 909 may have decorative heads or may be covered by decorative caps, if desired.

Figure 4:
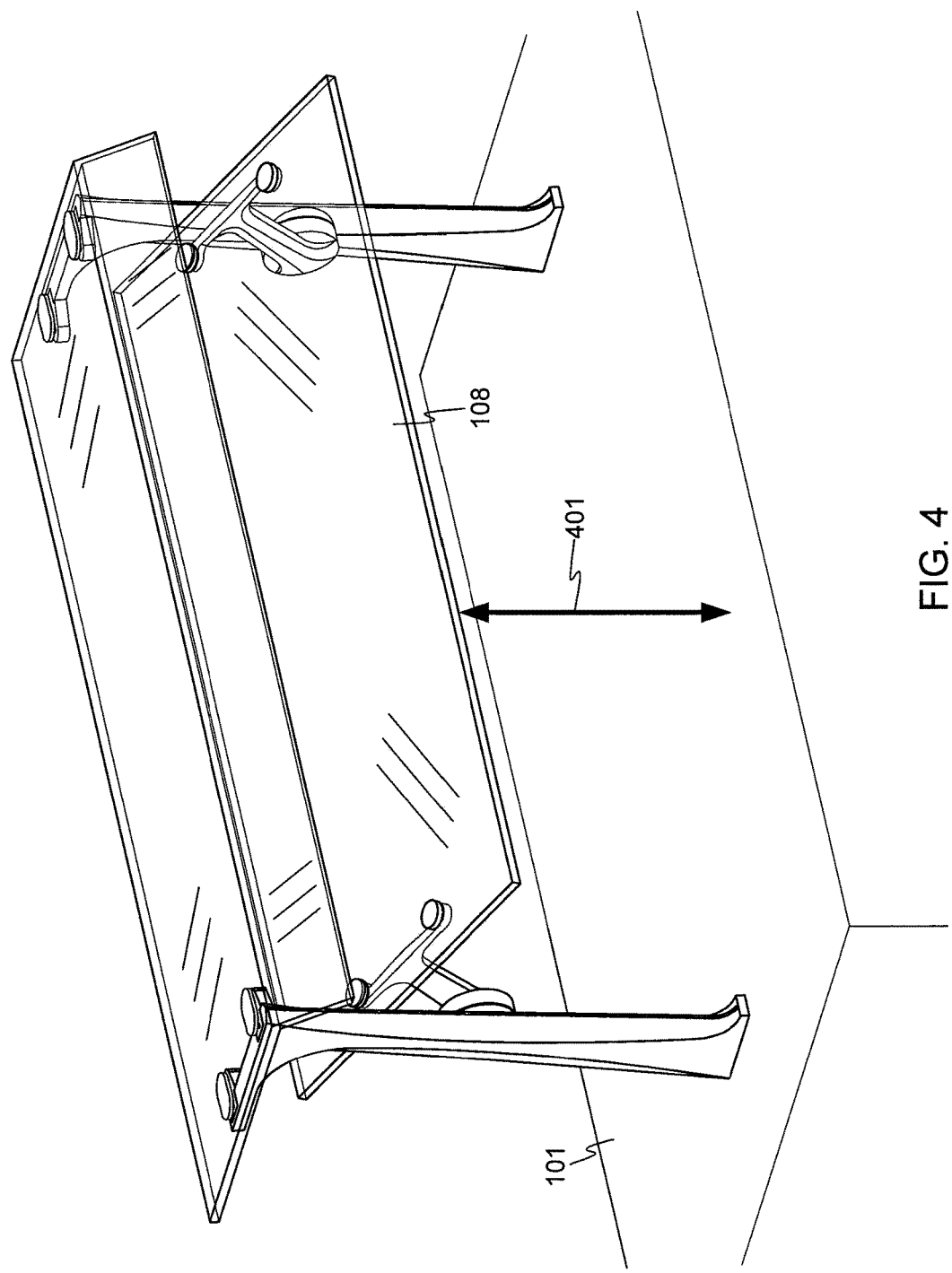
FIG. 4 illustrates the adjustable food shield of FIG. 1 in another alternate configuration.

Shield panel 908 can preferably reach at least the horizontal orientation under top shelf 903, as shown in FIG. 9, and vertical and intermediate orientations similar to those shown for shield panel 108 in FIGS. 3 and 4 and discussed above.

Figure 10A:
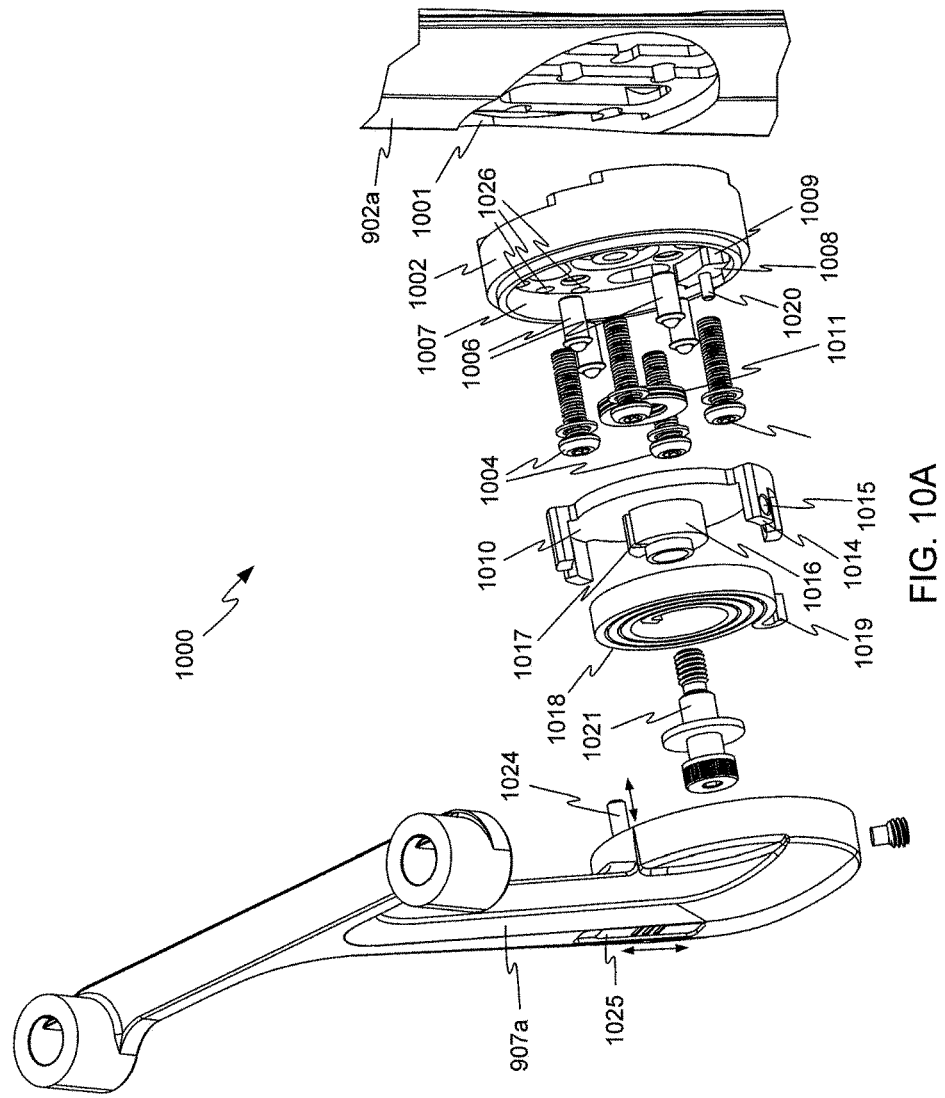
FIGS. 10A-10E illustrate a rotation and detent mechanism in accordance with embodiments of the invention, and a process of its assembly.
Figure 10B:
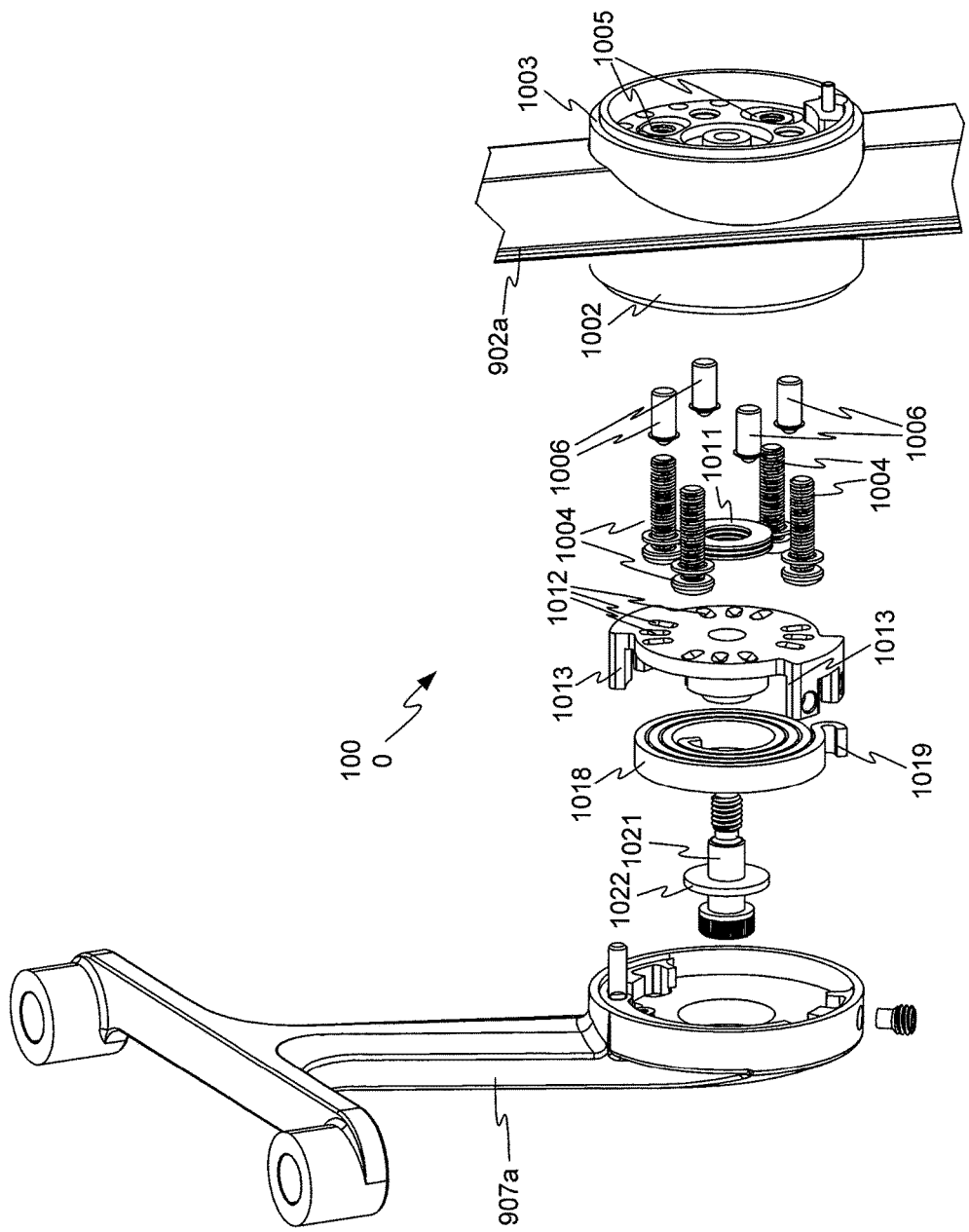

FIGS. 10A and 10B illustrate exploded perspective views of a rotation and detent mechanism 1000 in accordance with embodiments of the invention. Rotation and detent mechanism 1000 may be provided, for example, at the mountings of rotation arms 907a and 907b to support columns 902a and 902b.

As is visible in FIG. 10A, an integral recess 1001 is formed into support column 902a, for receiving detent body 1002. Recess 1001 and detent body 1002 may include interlocking features to ensure that detent body 1002 does not rotate with respect to support column 902a after installation of detent body 1002 into support column 902a. In FIG. 10B, detent body 1002 has been placed within recess 1001, and a second detent body 1003 has been placed in a similar recess in the opposite side of support column 902a. This arrangement may permit joining of several food shields together, as is discussed below in more detail. Machine screws 1004 pass through detent body 1002, support column 902a, and detent body 1003 and mate with nuts 1005 (two of which are visible in FIG. 10B). Preferably, detent body 1002 and detent body 1003 are identical and interchangeable.

Figure 10C:
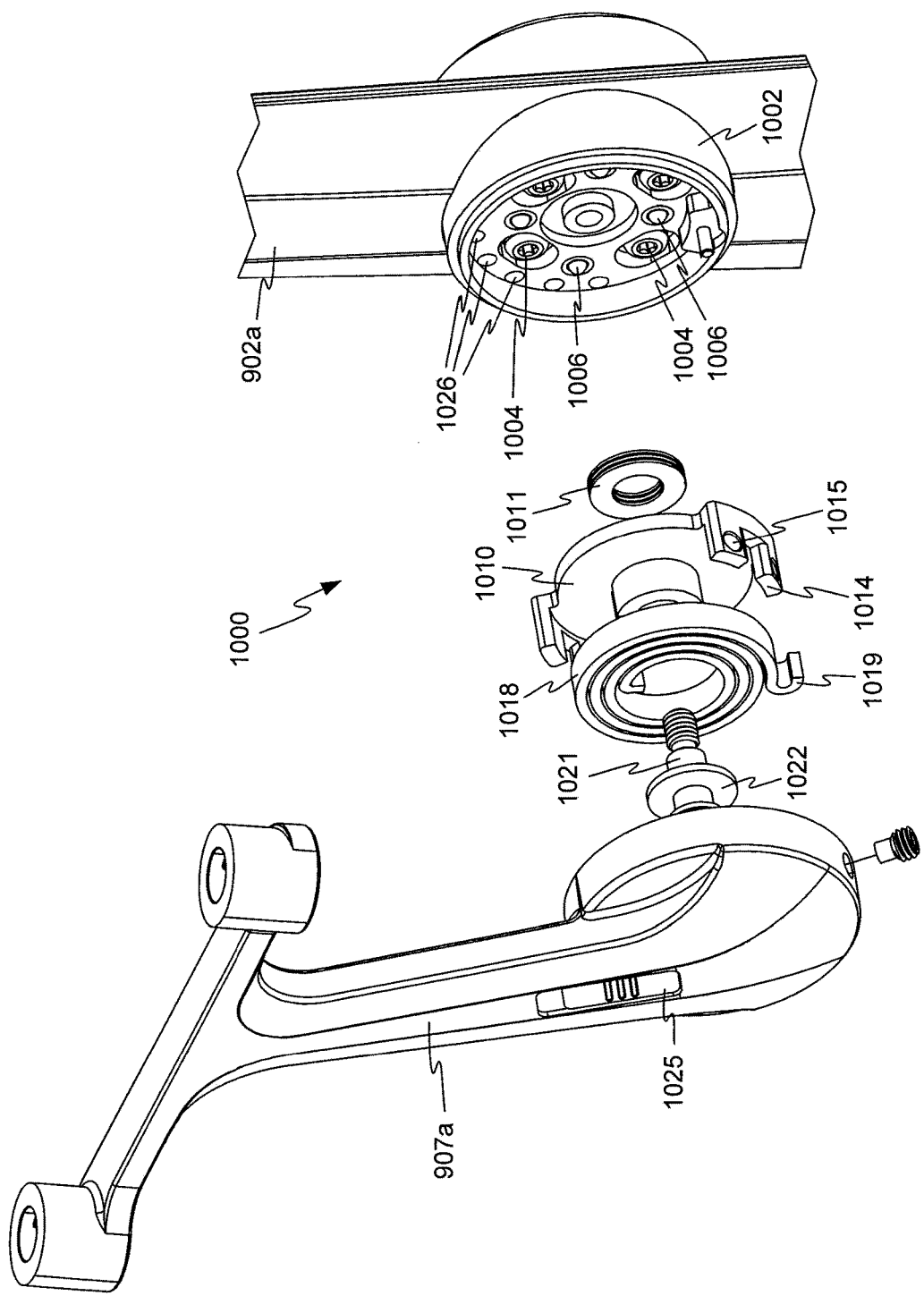

One or more ball plungers 1006 are inserted into detent body 1002, for example by a press fit into holes provided in detent body 1002. FIG. 10C illustrates rotation and detent mechanism 1000 after the installation of detent body 1002 to support column 902a and the installation of ball plungers 1006.

Detent body 1002 defines a cavity 1007 and includes a travel limiter 1008 that protrudes into cavity 1007 from the edge of detent body 1002. Travel limiter includes two fixed faces 1009 (only one of which is visible in FIG. 10A).

A detent plate 1010 nests and rotates within cavity 1007, on a thrust bearing 1011 between detent plate 1010 and detent body 1002. Detent plate 1010 may be made of any suitable material by any suitable method, but in some embodiments may be machined from steel or stainless steel, may be formed by sintering, or may be made in a different way. Detent plate 1010 may be hardened.

A number of recesses 1012 (visible in FIG. 10B) are formed in the back side of detent plate 1010, and engage with ball plungers 1006 to preferentially hold detent plate 1010 at a number of fixed rotational detent positions. Detent plate 1010 also includes at least two travel limiting faces 1013 positioned to engage fixed faces 1009 of detent body 1002, to define the extremes of rotation of detent plate 1002 and thus of shield panel 908.

Example detent plate 1010 further includes one or more raised tabs 1014 with openings 1015, for attachment of rotation arm 907a as is described in more detail below. Detent plate 1010 also includes a hub 1016 with a longitudinal groove 1017, for receiving one end of a coil spring 1018. At the other end of coil spring 1017, a hook feature 1019 is formed, for engaging with a pin 1020 protruding from detent body 1002.

A shoulder screw 1021 secures detent plate 1010 within detent body 1002, and provides an axle about which detent plate 1010 rotates. A thrust washer 1022 is positioned between the head of shoulder screw 1021 and detent plate 1010, and maintains detent plate 1010 against thrust bearing 1011.

Figure 10D:
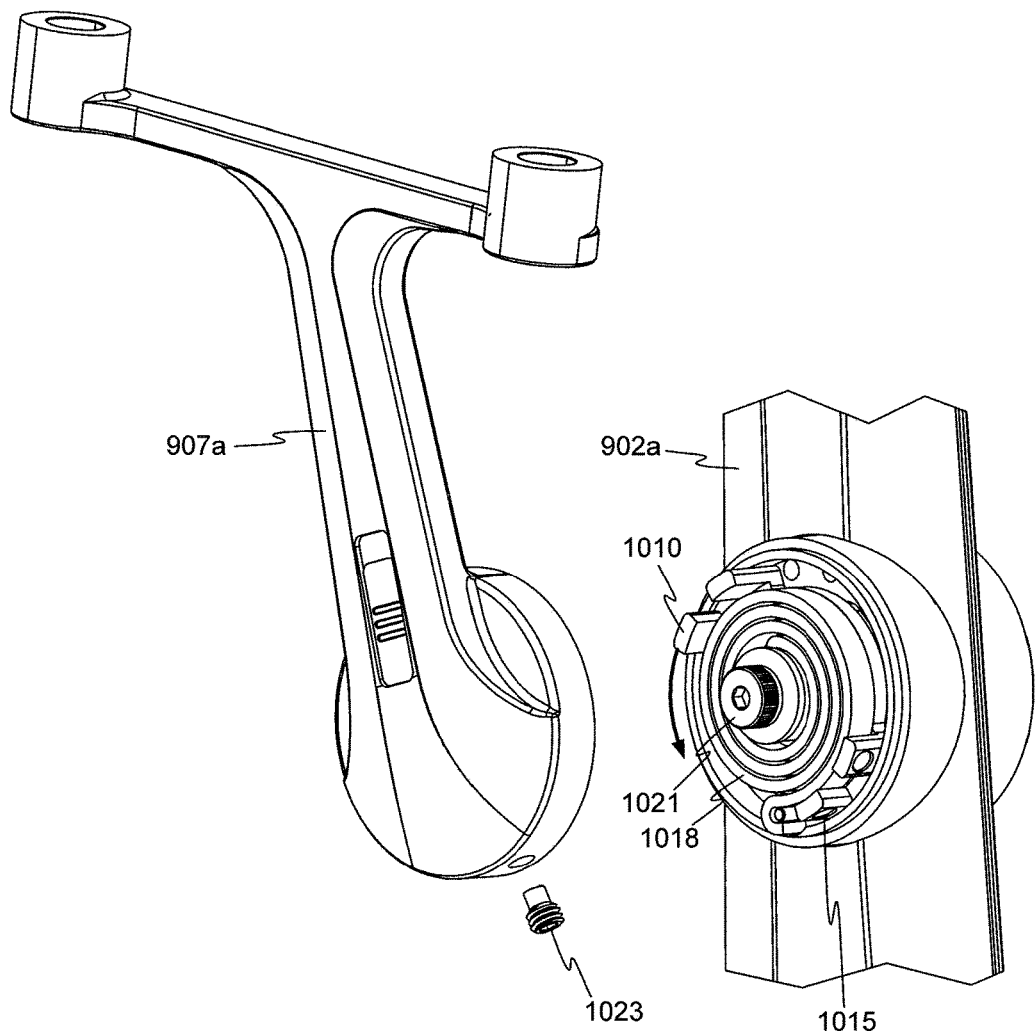

FIG. 10D shows rotation and detent mechanism 1000 after shoulder screw 1021 is installed. As can be seen, when detent plate 1010 is rotated in the direction shown, coil spring 1018 is tightened, and resists the motion. This movement direction is the direction that lowers shield panel 908 from its horizontal position (shown in FIG. 9) toward a vertical orientation (similar to FIG. 3). Thus, coil spring 1018 reduces the effort required to lift shield panel back toward its horizontal orientation. The stiffness of coil spring 1018 may be selected to provide a desired restoring torque to shield panel 908, for example by selecting the thickness of the stock from which coil spring is made, and the number of turns in coil spring 1018. Preferably, the stiffness of coil spring 1018 is selected so that the weight of shield panel 908 will hold shield panel 908 in its vertical (most downward) orientation against the restoring torque of two coil springs 1018 (one at each end of the panel), but so that shield panel 908 is easily lifted.

Figure 10E:
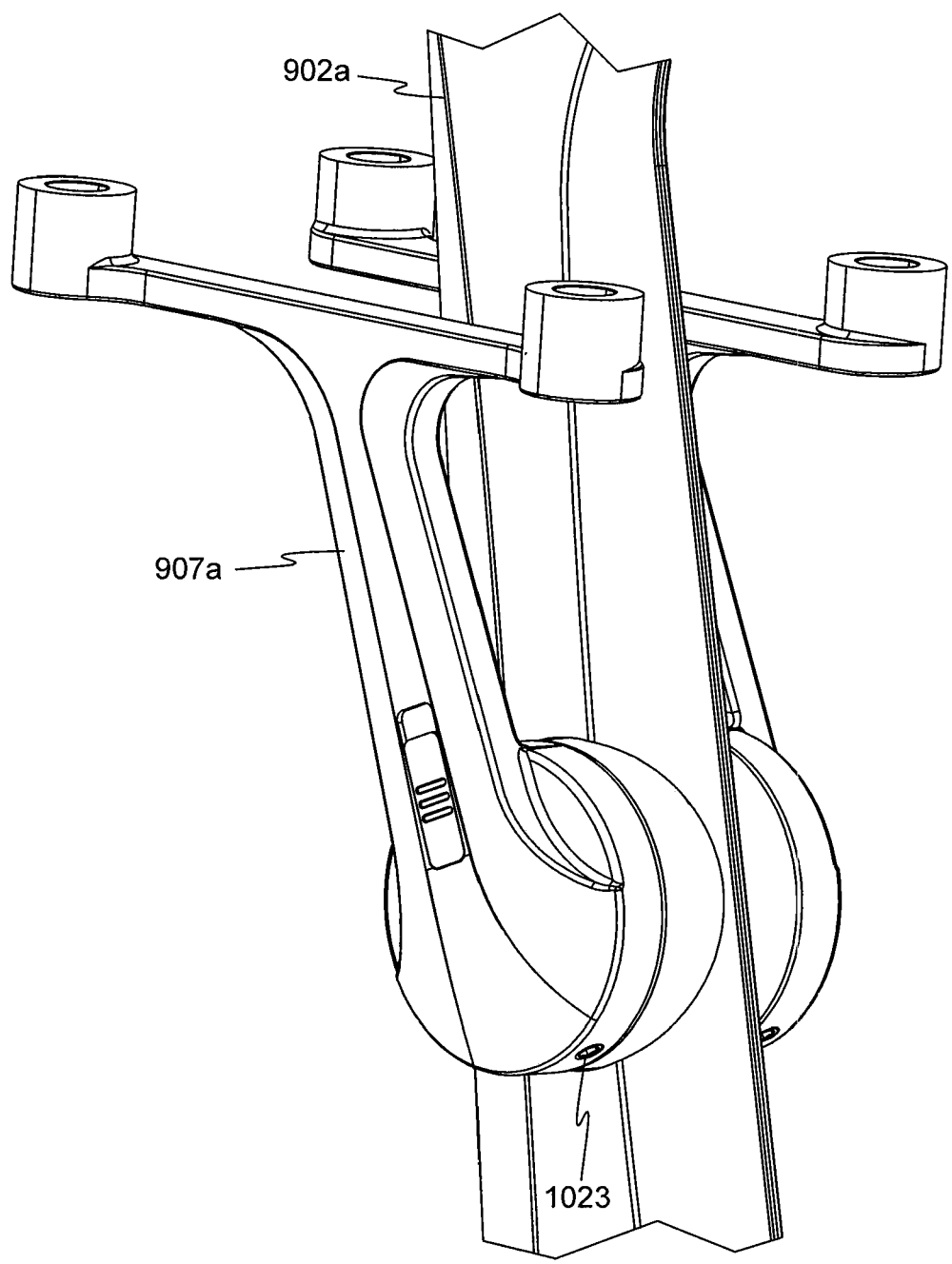

FIG. 10E shows rotation and detent mechanism 1000 fully assembled. Rotation arm 907a fits over the head of shoulder screw 1021, and is locked in place by dog point screw 1023, which threads into rotation arm 907a and engages one of openings 1015 in detent plate 1010. Other means of fastening rotation arm 907a to detent plate 1010 may be used as well.

Referring again to FIGS. 10A and 10C, rotation and detent mechanism 1000 may include a locking mechanism, to lock rotation arm 907a in any of a number of rotational positions. As is visible in FIG. 10A, a movable locking pin 1024 included in rotation arm 907a is actuated by a slide 1025. In addition, detent body 1002 includes a number of locking holes 1026, which preferably correspond to the detent positions provided by recesses 1012 and ball plungers 1006. Locking pin 1024 can be actuated to insert it into one of locking holes 1026, to hold detent plate 1010 (and thus shield panel 908) in a fixed position. To move shield panel 908, locking pin 1024 can be retracted using slide 1025, to permit rotation of detent plate 1010.

Figure 11B:
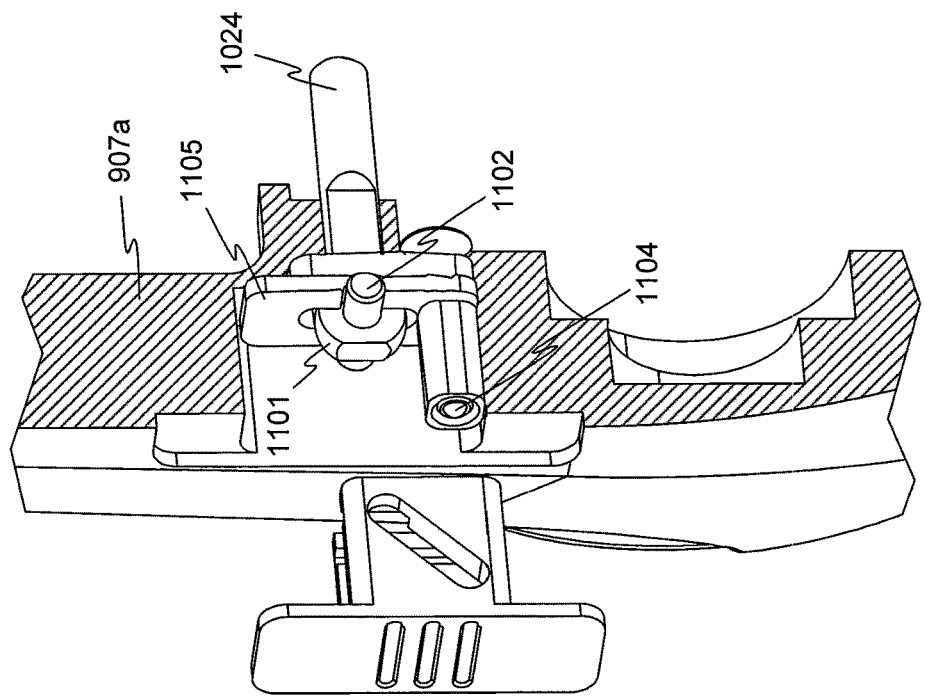
FIGS. 11A and 11B show cutaway perspective view of a locking mechanism, in accordance with embodiments of the invention.
Figure 11A:
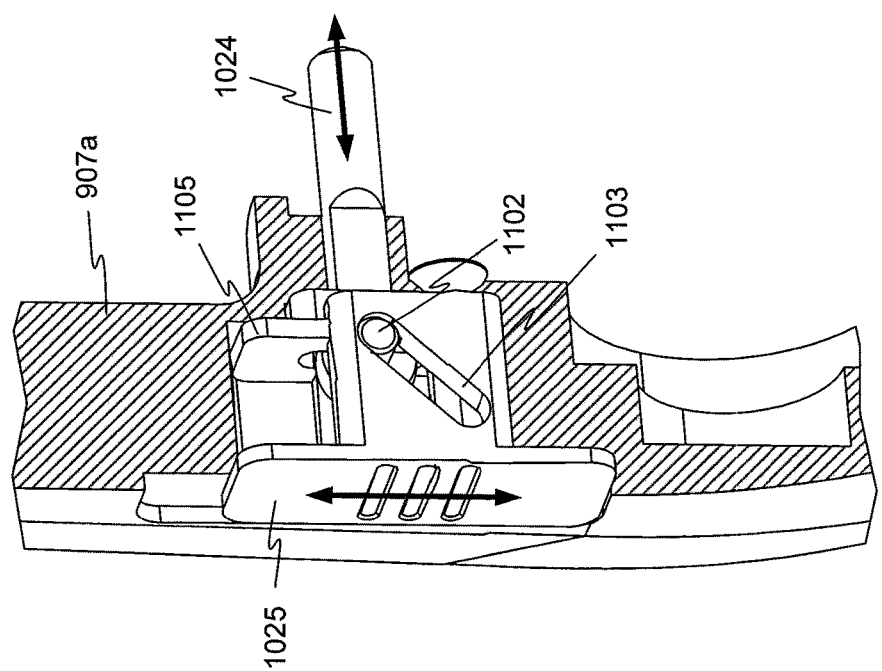

FIGS. 11A and 11B show cutaway perspective views of the locking mechanism, in accordance with embodiments of the invention. In FIGS. 11A and 11B, rotation arm 907a has been sectioned, to reveal the locking mechanism, and in FIG. 11B, slide 1025 has been moved back to reveal additional details.

As is visible in FIG. 11B, locking pin 1024 includes a yoke 1101, through which a cross pin 1102 is disposed. Cross pin 1102 rides in a pair of angled slots 1103 in slide 1025, such that raising slide 1025 withdraws locking pin 1024. A ball plunger 1104 is provided in a carrier block 1105, for engaging detents in slide 1025.

Figure 12:
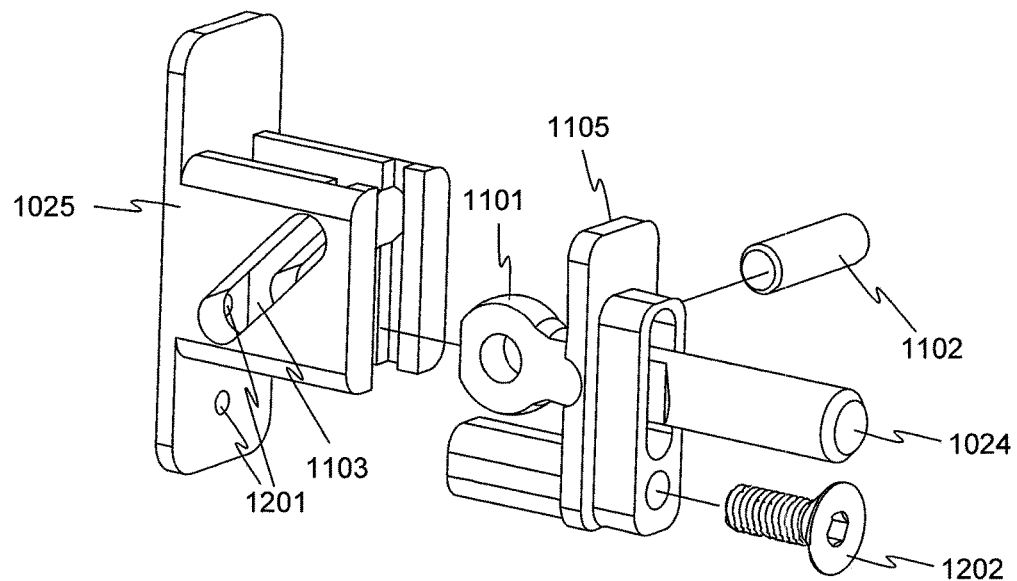
FIG. 12 is an exploded view of the components of the locking mechanism of FIGS. 11A and 11B.

FIG. 12 is an exploded view of the components of the locking mechanism. Two detent recesses 1201 are visible in slide 1025, for receiving the ball of ball plunger 1104 in the raised and lowered positions of slide 1025. A screw 1202 fixes carrier block 1105 to rotation arm 907a.

Figures 13A, 13B:
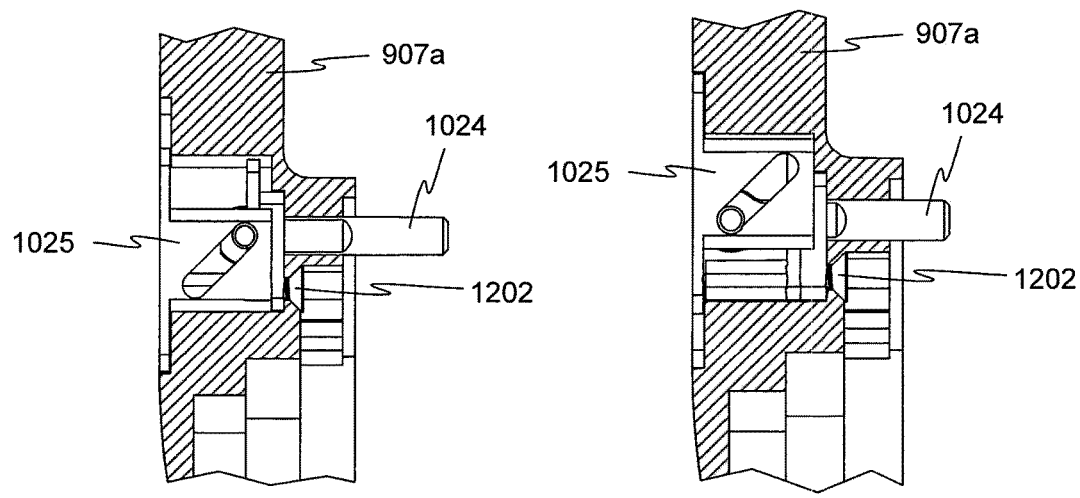
FIGS. 13A and 13B are orthogonal section views of a rotation arm, showing additional details of the locking mechanism of FIGS. 11A and 11B.

FIGS. 13A and 13B are orthogonal section views of rotation arm 907a. FIG. 13A shows slide 1025 in its lowered position, with locking pin 1024 extended. FIG. 13B shows slide 1025 in its raised position, with locking pin 1024 retracted.

Figure 14:
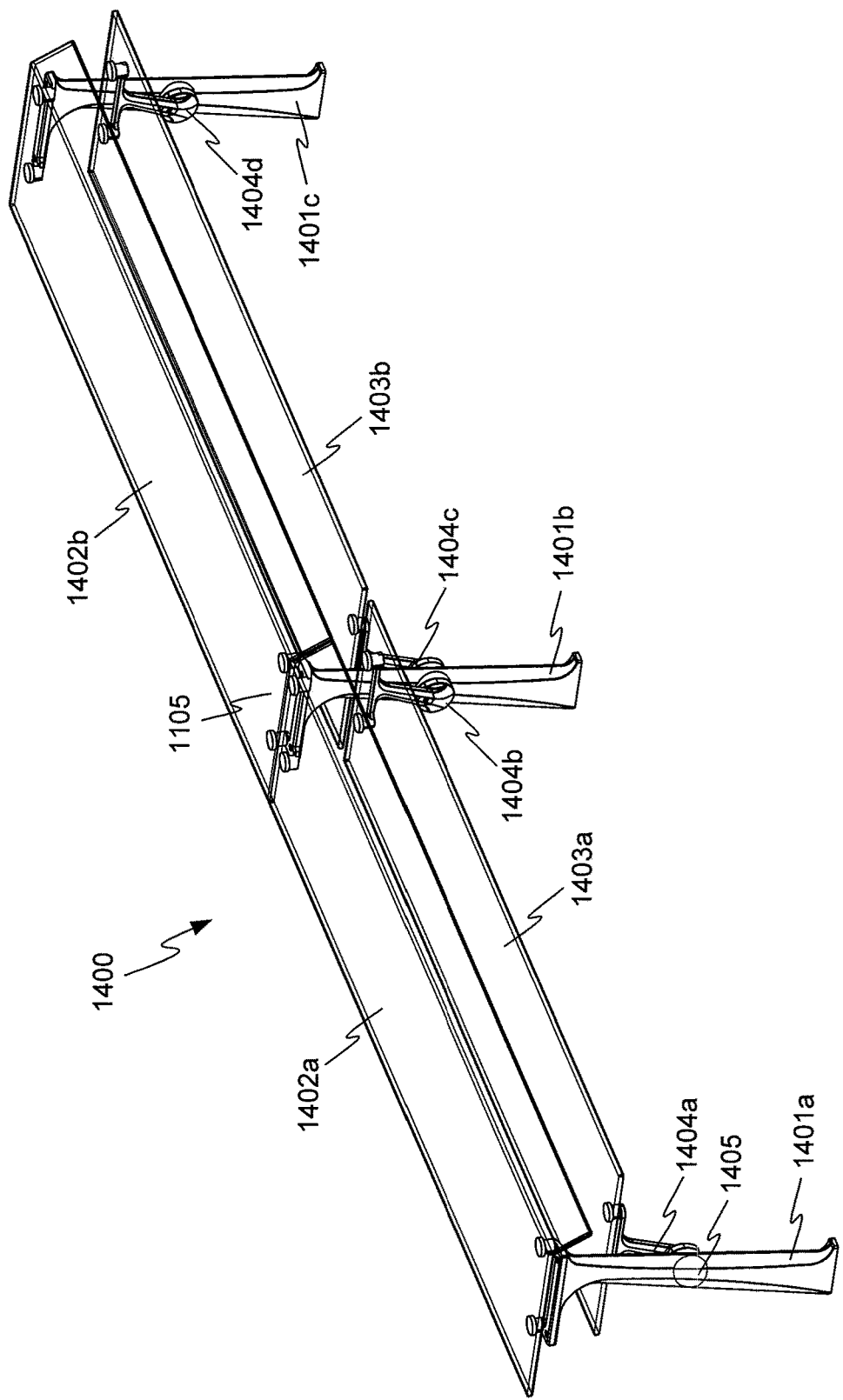
FIG. 14 illustrates a double food shield in accordance with embodiments of the invention.

In some embodiments, the components of food shield 900 may be combined to form longer displays. FIG. 14 illustrates a double food shield 1400 in accordance with embodiments of the invention, having three support columns 1401a, 1401b, 1401c, two top shelves 1402a, 1402b, and two shield panels 1403a, 1403b, supported by four rotation arms 1404a, 1404b, 1404c, 1404d. Two rotation and detent mechanisms attach to center support column 1401b, and one each to end support columns 1401a and 1401c. In place of an outer detent body, a decorative plate 1405 may be provided at each end or food shield 1400. Triple and longer food shields may be constructed as well.

Preferably, other than the rotation arms, all or nearly all of the components of food shield 1400 are symmetrical. That is, all of the support columns may be identical, and the components of the rotation and detent mechanisms may be the same regardless of which end of a particular shield panel they are used to support.

Figure 15:
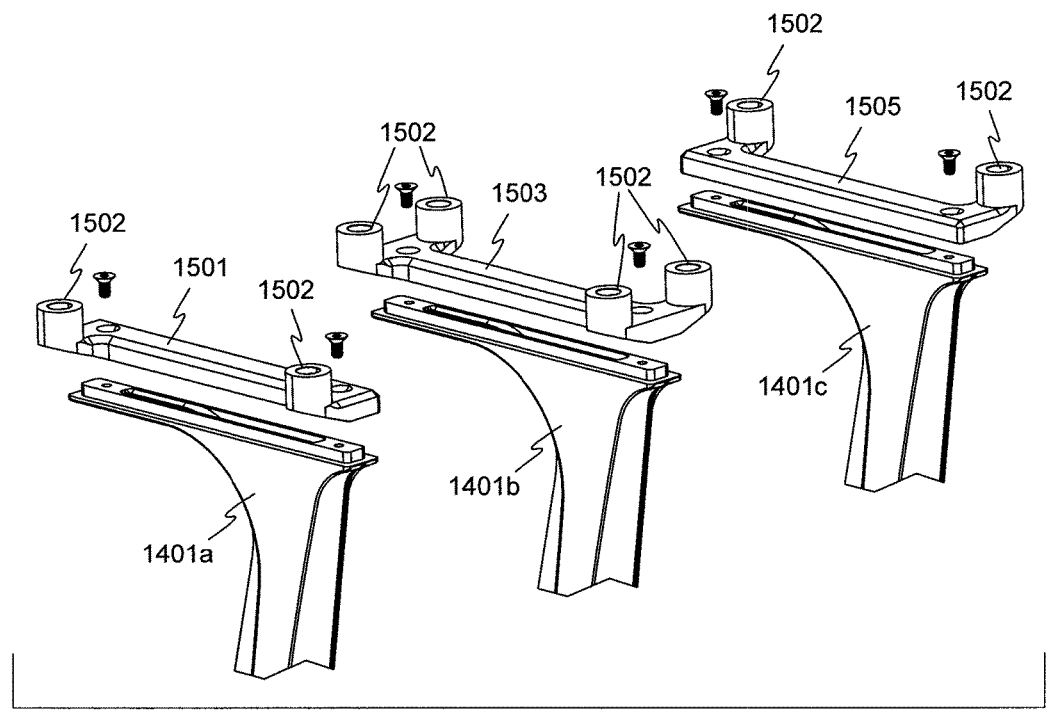
FIG. 15 shows the tops of support columns and associated shelf mount brackets, in accordance with embodiments of the invention.

Symmetry of the support columns may be enabled by using separate shelf mounting brackets at the tops of the support columns. FIG. 15 shows the tops of support columns 1401a, 1401b, and 1401c and their associated shelf mount brackets, in accordance with embodiments of the invention. Shelf mounting bracket 1501 is configured to mount to support column 1401a and provide a "left end" shelf support, and has two shelf mounting bosses 1502 positioned outboard (left) of support column 1401a. Shelf mounting bracket 1503 is configured to mount to support column 1401b and provide a "center" shelf support, with two sets of shelf mounting bosses extending on both sides of support column 1401b. Shelf mounting bracket 1504 is configured to mount to support column 1401c and provide a "right" shelf support, with two shelf mounting bosses 1502 positioned outboard (right) of support column 1401c. It will be recognized that "left" and "right" brackets 1501 and 1505 may be identical parts, installed in opposite orientations.

Figure 16A:
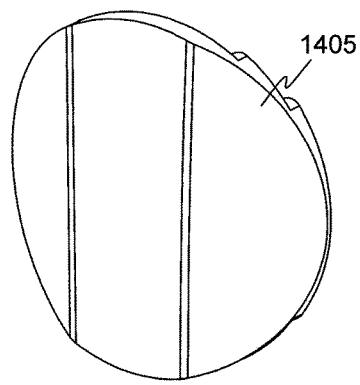
FIGS. 16A and 16B illustrate a decorative plate in accordance with embodiments of the invention.
Figure 16B:
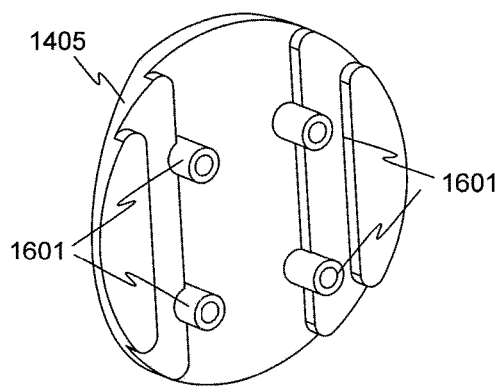

FIGS. 16A and 16B illustrate decorative plate 1405 in more detail. FIG. 16A shows the outer surface of decorative plate 1405, configured to match the outer surface of a support column. FIG. 16B shows the inner side of decorative plate 1405. Bosses 1601 preferably include threaded holes for accepting mounting screws 1004 of a rotation and detent mechanism mounted on the opposite side of a support column from decorative plate 1405, in place of nuts 1005.

The invention has now been described in detail for the purposes of clarity and understanding. However, those skilled in the art will appreciate that certain changes and modifications may be practiced within the scope of the appended claims.

What is claimed is:

1. A rotation and detent mechanism, comprising:
   a body defining a cavity, the body having a travel limiter protruding into the cavity, the travel limiter having two fixed faces;
   a detent plate of a shape and size to nest and rotate within the cavity of the body, the detent plate having two limiting surfaces between which the travel limiter of the body is disposed, such that one of the two limiting surfaces engages a respective one of the fixed travel limiting faces of the body at each extreme of angular rotation of the detent plate, and the detent plate includes a plurality of recesses on a face perpendicular to the axis of the rotation of the detent plate;
   one or more spring loaded ball plungers mounted in the body and aligned with the axis of rotation of the detent plate, each ball plunger positioned to engage a recess in the detent plate at each of certain angular positions of the detent plate within the body, such that the certain angular positions are detent positions;
   an axle on which the detent plate rotates, the axle defining an axis of rotation of the detent plate; and
   a spiral coil spring that engages the detent plate and the body such that the spiral coil spring resists rotation of the detent plate within the body in a first rotational direction and assists rotation of the detent plate within the body in a second rotational direction opposite the first.

2. The rotation and detent mechanism of claim 1, further comprising:
   a shoulder screw that functions as the axle and constrains the detent plate axially with respect to the body;
   a thrust bearing between the detent plate and the body; and
   a thrust washer between the head of the shoulder screw and the detent plate, the thrust washer maintaining the detent plate against the thrust bearing.

3. The rotation and detent mechanism of claim 1, wherein:
   the detent plate includes a hub having a groove for receiving a first end of the spiral coil spring; and
   a pin protrudes from the body in a direction parallel with the axis of rotation of the detent plate and the spiral coil spring is formed into a hook at a second end for engaging the pin.

4. The rotation and detent mechanism of claim 1, further comprising a rotation arm affixed to the detent plate, the rotation arm having a base portion and an extending portion, wherein the body and the base portion of the rotation arm enclose the detent plate and the spiral coil spring.

5. The rotation and detent mechanism of claim 4, wherein:
   the body defines a plurality of locking holes; and
   the rotation arm includes a locking mechanism having a slide-actuated pin that aligns with one of the locking holes in the body at each of the detent positions of the detent plate, permitting insertion of the locking pin into the body to lock the rotation arm in a particular rotational position.

6. The rotation and detent mechanism of claim 5, wherein the slide-actuated pin includes a yoke, and wherein the locking mechanism further comprises:
   a sliding element that defines two angled slots; and
   a cross pin disposed within the yoke of the slide-actuated pin such that the ends of the cross pin ride in the angled slots as the sliding element is moved.

7. An adjustable food shield, comprising:
   a pair of support columns, one at each end of the adjustable food shield, each of the support columns having a top end and a bottom end and including features for affixing the support column to a surface at the bottom end of the support column, and at least one of the support columns including an integral feature between the top and bottom ends for coupling to a rotation and detent mechanism;
   a shield panel; and
   a rotation and detent mechanism coupled to the integral feature, the rotation and detent mechanism comprising:
   a body defining a cavity, the body having a travel limiter protruding into the cavity, the travel limiter having two fixed faces;
   a detent plate of a shape and size to nest and rotate within the cavity of the body, the detent plate having two limiting surfaces between which the travel limiter of the body is disposed, such that one of the two limiting surfaces engages a respective one of the fixed travel limiting faces of the body at each extreme of angular rotation of the detent plate, and the detent plate includes a plurality of recesses on a face perpendicular to the axis of the rotation of the detent plate;
   one or more spring loaded ball plungers mounted in the body and aligned with the axis of rotation of the detent plate, each ball plunger positioned to engage a recess in the detent plate at each of certain angular positions of the detent plate within the body, such that the certain angular positions are detent positions;
   an axle on which the detent plate rotates, the axle defining an axis of rotation of the detent plate;
   a spiral coil spring that engages the detent plate and the body such that the spiral coil spring resists rotation of the detent plate within the body in a first rotational direction and assists rotation of the detent plate within the body in a second rotational direction opposite the first; and
   a rotation arm coupled to the detent plate such that the rotation arm rotates with the detent plate, and wherein the shield panel is coupled to the rotation arm.

8. The adjustable food shield of claim 7, wherein the integral feature is a recess.

9. The adjustable food shield of claim 7, wherein the integral feature is a first integral feature on a first side of the support column, and wherein the support column includes a second integral feature like the first on a second side of the support column, opposite the first side.

10. The adjustable food shield of claim 7, wherein the rotation and detent mechanism limits the angular travel of the rotation arm and shield panel, and wherein the shield panel can reach at least a horizontal orientation under a top shelf attached to the tops of the support columns, and a vertical orientation below the front edge of the top shelf.

11. The adjustable food shield of claim 10, wherein the rotation and detent mechanism provides detents for the horizontal orientation of the shield panel, the vertical orientation of the shield panel, and at least one intermediate orientation of the shield panel between the horizontal and vertical orientations.

12. The adjustable food shield of claim 7, further comprising at least one retractable locking pin configured to lock the rotation and detent mechanism at each of the detent positions.

13. The adjustable food shield of claim 12, wherein the retractable locking pin is actuated by a locking mechanism included in the rotation arm.

14. The adjustable food shield of claim 13, wherein the retractable pin includes a yoke, and wherein the locking mechanism further comprises:
   a sliding element that defines two angled slots; and
   a cross pin disposed within the yoke of the slide-actuated pin such that the ends of the cross pin ride in the angled slots as the sliding element is moved.

15. The adjustable food shield of claim 7, wherein the support columns have identical main portions, and wherein a bracket is attached to the top end of each of the support columns, each bracket including features for attaching a top shelf above the support columns.

16. The adjustable food shield of claim 15, wherein the brackets attached to the two support columns are identical, but are installed in opposite orientations.

17. The adjustable food shield of claim 15, wherein at least one of the brackets is a two-sided bracket including features for attaching two top shelves, one at each side of the support column to which the two-sided bracket is attached.

18. The adjustable food shield of claim 7, wherein both support columns include integral features between their top and bottom ends for coupling to respective rotation and detent mechanisms, and wherein the food shield comprises two rotation and detent mechanism, one coupled to each of the support columns, and both rotation and detent mechanisms are coupled to the shield panel.

* * * * *